United States Patent [19]

Demus et al.

[11] Patent Number: 4,519,936
[45] Date of Patent: May 28, 1985

[54] NEMATIC LIQUID CRYSTALS AND METHOD OF PRODUCTION

[75] Inventors: Dietrich Demus, Halle; Wolfgang Weissflog, Halle-Neustadt; Horst Kresse, Halle, all of German Democratic Rep.

[73] Assignee: VEB Werk fuer Fernsehelektronik im Kombinat Mikroelektronik, Berlin, German Democratic Rep.

[21] Appl. No.: 400,170

[22] Filed: Jul. 20, 1982

[51] Int. Cl.³ .................. G02F 1/13; C09K 3/34; C07C 231/119; C07C 231/120

[52] U.S. Cl. .................. 252/299.63; 252/299.64; 260/463; 350/350 R; 560/1; 560/60; 560/61; 560/70; 560/72; 560/73; 560/105; 560/107; 560/108; 560/126; 560/138

[58] Field of Search .................. 252/299.63, 299.64; 350/350 R; 560/1, 70, 60, 61, 72, 73, 126, 105, 107, 108, 138; 260/463

[56] References Cited

U.S. PATENT DOCUMENTS 4,099,856 7/1978 Weissflog et al. .............. 252/299.64
4,293,434 10/1981 Deutscher et al. ............. 252/299.63

FOREIGN PATENT DOCUMENTS 146041 1/1981 German Democratic Rep. .................. 252/299.63
57-82347 5/1982 Japan .................. 252/299.62

OTHER PUBLICATIONS

Demus, D., et al., Mol. Cryst. Liq. Cryst., vol. 63, pp. 129–144, (Jan. 1981).
Arora, S., et al., J. Org. Chem., vol. 35, No. 12, pp. 4055–4058, (1970).
Dewar, M. J. S. et al., J. Am. Chem. Soc., vol. 92, No. 6, pp. 1582–1586, (1970).
Griffin, A., Mol. Cryst. Liq. Cryst., vol. 44, pp. 267–276, (1978).

Primary Examiner—Teddy S. Gron
Attorney, Agent, or Firm—Jordan and Hamburg

[57] ABSTRACT

The invention relates to nematic liquid crystals in electro-optical components for the modulation of light as well as for the representation of numerals, signs and images and to a method for producing the same.

It is the object of the invention to create nematic liquid crystals which are well suited for electro-optical devices, preferably for two-frequency operation.

It has been found that pure or mixed 2-n-alkyl-1, 4-bis-[4-acyloxy]-benzenes of the general formula

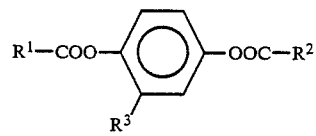

wherein $R^3 = n - C_m H_{2m+1}$, with $m = 3$ to 14, are well suited for utilization in electro-optical components.

It was found that 2-n-alkyl-1,4-bis-[acyloxy]-benzene which is well suited for electro-optical components, and especially for two-frequency operations, can be produced by the conversion of a correspondingly substituted benzoic acid or cyclohexane carboxylic acid or a reaction-capable derivative thereof with the corresponding 2-n-alkylhydroquinone—also in the form of its phenylate—at a temperature ranging from 0° C. to 250° C., possibly in the presence of an inert solvent.

20 Claims, No Drawings

NEMATIC LIQUID CRYSTALS AND METHOD OF PRODUCTION

BACKGROUND OF THE INVENTION AND PRIOR ART STATEMENT

This invention relates to nematic liquid crystals in electro-optical components for the nodulation of traversing or reflected light as well as for the representation of numerals, signs and images as well as to a method for producing the same. In view of their electric anisotropy, liquid crystals exhibit a special interaction effect with electric fields and may, therefore, be oriented. Nematic liquid crystals with positive dielectric anisotropy orient themselves parallel to the electric field, whereas those with negative dielectric anisotropy orient themselves vertical to the field. In view of dielectric relaxiation, negative dielectric anisotropy may occur above the relaxation frequency in certain liquid crystals which have positive dielectric anisotropy at low frequencies. In the vicinity of the relaxation frequency (isotropic frequency), dielectric anisotropy equals zero. It has already been proposed to utilize this effect in electro-optical displays by operating the display at two frequencies (DD-WP 107 561).

This type of activation makes it possible to change the on and off switching time solely through a change in the strength of the electric field so that, on normal operation, very slow pulse decays of dielectric information can be considerably shortened. The previously known substances have either an uncomfortably high relaxation frequency (in the MHz range), too high melting temperatures, or yet are chemically and thermally unstable. The previously known 2-subst.-1,4-bis[4-acyloxy]-benzenes (WP 106 933, 108 022, 108 023, 116 732, 139 575, 139 592; also A. C. Griffin et al. Mol. Cryst. Liqu. Cryst. 44, 267 (1978); T. A. Rotinyan et al. Kristallografya 23, 578 (1978)), in which the 2-substituent, however, is rather short, also are ill-suited to the two frequency range in view of their high relaxation frequencies. Therefore, an active search for new substances that do not have these disadvantages, or have them on a very limited scale, continues.

The liquid crystal compounds produced according to the method of this invention are new, no methods for their production being previously known.

The previously known 2-subst.-1,4-bis-[4-acyloxy]-benzenes of the general formula:

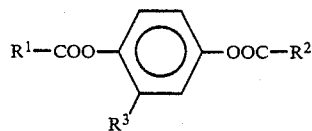

obtained through the conversion of a corresponding 2-subst. hydroquinone with a corresponding subst. benzoic acid or cyclohexane carboxylic acid or one of its derivatives, have only short-chained substituents in the 2-position on the benzene ring [WP 106 933, 108 022, 108 023, 116 732, 139 575, 139 592; A. C. Griffin, D. L. Wertz, A. C. Griffin Jr.: Mol. Cryst. Liqu. Cryst. 44, 267 (1978); T. A. Rotinyan, Ch. K. Rout, A. P. Kovshik, P. V. Adomenas, Yu. Yu. Dangvila, E. I. Ryumtsev: Kristallogr. 23, 578 (1978)]. However, these substances are ill-suited for two-frequency operations since their relaxation frequencies lie relatively high (in the MHz range).

It is the object of the invention to create new nematic liquid crystals with low relaxation frequencies, low melting temperatures and good chemical and thermal stability which are well-suited for electro-optical devices, preferably for two-frequency operation, as well as methods for producing the same.

SUMMARY OF THE INVENTION

It was found that pure or mixed 2-n-alkyl-1,4-bis-[4-acyloxy]-benzenes of the general formula

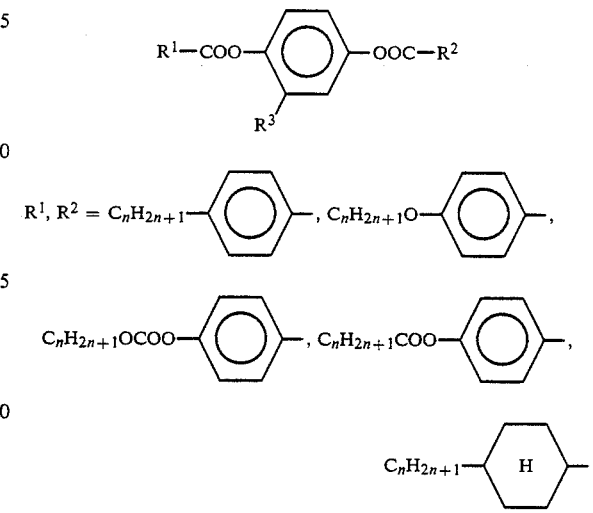

wherein n = 1 to 16 wherein
n=1 to 16,
$R^3 = n\text{-}C_mH_{2m+1}$,
wherein m=3 to 14
are well suited for utilization in corresponding electro-optical components.

Through the addition of these substances, the relaxation frequencies of nematic liquid crystals with positive dielectric anisotropy are strongly altered to low values. As the investigations of Vorländer (D. Vorländer, Chemische Kristallographie der Flüssigkeiten, Leipzig 1924) as also the entire contemporary literature (D. Demus, H. Demus and H. Zaschke, Flüssige Kristalle in Tabellen, VEB Deutscher Verlag für Grundstoffindustrie, 2nd ed., Leipzig 1976) show, the molecules of liquid crystals need to be of possibly long-chained molecular construction.

Therefore, in substances of the 2-subst.-1,4-bis-[4-acyloxy]-benzene type, liquid crystal properties can only be expected in short 2-substituents. It comes as a complete surprise that derivatives in the 2-position with relatively long n-alkyl chains should have liquid crystal properties and, moreover, strongly lower the relaxation frequencies of compounds.

The substances according to this invention have good thermal and chemical stability and, in part, very low conversion temperatures.

DETAILED DESCRIPTION OF PREFERRED EMBODIMENTS

It was found that 2-n-alkyl-1,4-bis-[acyloxy]-benzenes, which are well suited for electro-optical compounds and preferred for two-frequency operations, can be produced through the reaction of a correspondingly substituted benzoic acid or cyclohexane carboxylic acid, or of a reaction-capable derivative thereof with the relative 2-n-alkyl-hydroquinone—also in the form of a phenylate—at a temperature between 0° C. and 250° C., possibly in the presence of an inert organic solvent.

Reaction conditions for the method of this invention depend on the reaction capacity of the derivative used. Thus, the free carboxylic acids react with the hydroquinones in suitable solvents, for instance, tetrahydrofuran, pyridine, dimethylformamide, and with water-splitting reactants, such as dicyclohexylcarbodiimide. A preferred type of reaction is the conversion of a substituted benzoylchloride with 2-alkyl-hydroquinone in the presence of organic bases, such as, for instance, pyridine, triethylamine, quinoline, or inorganic bases, such as, for instance, potassium or sodium hydroxide, sodium carbonate, sodium bicarbonate. Thus, the conversions are conveniently carried out in the presence of an inert solvent. Diethyl and dibutyl ethers, dioxane, benzene or toluene are especially suitable. An excess of the organic base used, for instance pyridine, triethylamine or quinoline may, at the same time, serve as a solvent.

The reaction temperature may lie between 0° and +250° C., preferably between 100° C. and 140° C. With these temperatures, as a rule, esterification reactions are completed in 30 minutes to 24 hours.

The invention will now be explained in more detail by way of six examples.

EXAMPLE 1

The following tables 1 and 2 show the transition temperatures of some substances according to this invention.

TABLE 1

2-n-Alkyl-1,4-bis-[4-n-alkoxybenzoyloxy]-benzenes

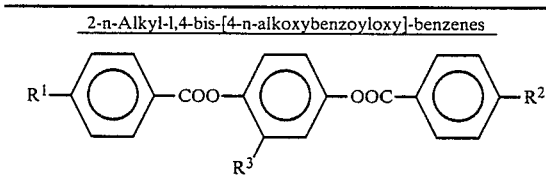

| $R^1 = R^2$ | $R^3$ | K | N | I |
|---|---|---|---|---|
| $CH_3O$ | $C_3H_7$ | . 127 | . 135.5 | . |
| $CH_3O$ | $C_4H_9$ | . 122–124.5 | . (105.5) | . |
| $CH_3O$ | $C_5H_{11}$ | . 98–100 | . (85) | . |
| $CH_3O$ | $C_6H_{13}$ | . 90–91.5 | . (77) | . |
| $CH_3O$ | $C_7H_{15}$ | . 81–82 | . (70) | . |
| $CH_3O$ | $C_8H_{17}$ | . 81–82 | . (67) | . |
| $CH_3O$ | $C_9H_{19}$ | . 90–91 | . (64–65) | . |
| $CH_3O$ | $C_{10}H_{21}$ | . 83–83.5 | . (60–61) | . |
| $CH_3O$ | $C_{11}H_{23}$ | . 81–81.5 | . (58) | . |
| $CH_3O$ | $C_{12}H_{25}$ | . 89–90 | . (56) | . |
| $C_2H_5O$ | $C_3H_7$ | . 150–153 | . 155–156 | . |
| $C_2H_5O$ | $C_4H_9$ | . 148–151 | . (130–131) | . |
| $C_3H_7O$ | $C_3H_7$ | . 87–89 | 120–121.5 | . |
| $C_3H_7O$ | $C_4H_9$ | . 109–111 | . (99–100) | . |
| $C_4H_9O$ | $C_3H_7$ | . 84–86 | . 125.5–126 | . |
| $C_4H_9O$ | $C_4H_9$ | . 104–105 | . 110 | . |
| $C_5H_{11}O$ | $C_3H_7$ | . 81–83 | . 106–106.5 | . |
| $C_5H_{11}O$ | $C_4H_9$ | . 85–86 | . 94 | . |
| $C_6H_{13}O$ | $C_3H_7$ | . 56–59 | . 107–107.5 | . |
| $C_6H_{13}O$ | $C_4H_9$ | . 67–68 | . 96.5 | . |
| $C_6H_{13}O$ | $C_5H_{11}$ | . 77–78.5 | . 88 | . |
| $C_6H_{13}O$ | $C_6H_{13}$ | . 60–61 | . 83 | . |
| $C_6H_{13}O$ | $C_7H_{15}$ | . 59–61 | . 79–79.5 | . |
| $C_6H_{13}O$ | $C_8H_{17}$ | . 66–68.5 | . 77 | . |
| $C_6H_{13}O$ | $C_9H_{19}$ | . 66–68 | . 76.5 | . |
| $C_6H_{13}O$ | $C_{10}H_{21}$ | . 67–68 | . 72 | . |
| $C_6H_{13}O$ | $C_{11}H_{23}$ | . 69–71 | . 69 | . |
| $C_6H_{13}O$ | $C_{12}H_{25}$ | . 62–65 | . 67 | . |

TABLE 1-continued 2-n-Alkyl-1,4-bis-[4-n-alkoxybenzoyloxy]-benzenes

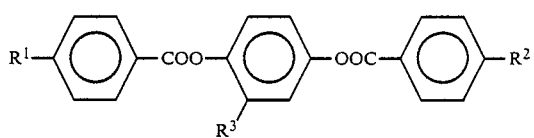

| $R^1 = R^2$ | $R^3$ | K | N | I |
|---|---|---|---|---|
| $C_6H_{13}O$ | $C_{16}H_{33}$ | . 58–61 | . 64–64.5 | . |
| $C_7H_{15}O$ | $C_3H_7$ | . 56–58 | . 99 | . |
| $C_7H_{15}O$ | $C_4H_9$ | . 65–67 | . 90 | . |
| $C_7H_{15}O$ | $C_5H_{11}$ | . 74–75 | . 83 | . |
| $C_7H_{15}O$ | $C_6H_{13}$ | . 59–60 | . 79 | . |
| $C_7H_{15}O$ | $C_7H_{15}$ | . 54–56 | . 75.5 | . |
| $C_7H_{15}O$ | $C_8H_{17}$ | . 59–60 | . 74 | . |
| $C_7H_{15}O$ | $C_9H_{19}$ | . 60–61 | . 73.5 | . |
| $C_7H_{15}O$ | $C_{10}H_{21}$ | . 58–60 | . 69.5 | . |
| $C_7H_{15}O$ | $C_{11}H_{23}$ | . 66–67.5 | . 67.5 | . |
| $C_7H_{15}O$ | $C_{12}H_{25}$ | . 61–61.5 | . 65.5 | . |
| $C_7H_{15}O$ | $C_{16}H_{33}$ | . 66–67 | . (62) | . |
| $C_8H_{17}O$ | $C_3H_7$ | . 51–52.5 | . 97.5–98 | . |
| $C_8H_{17}O$ | $C_4H_9$ | . 57–58 | . 91 | . |
| $C_8H_{17}O$ | $C_5H_{11}$ | . 68–69.5 | . 84.5 | . |
| $C_8H_{17}O$ | $C_6H_{13}$ | . 61–62 | . 81.5 | . |
| $C_8H_{17}O$ | $C_7H_{15}$ | . 52–53 | . 78.5 | . |
| $C_8H_{17}O$ | $C_8H_{17}$ | . 57–58.5 | . 77.5 | . |
| $C_8H_{17}O$ | $C_9H_{19}$ | . 65–67 | . 77 | . |
| $C_8H_{17}O$ | $C_{10}H_{21}$ | . 59–60 | . 74 | . |
| $C_8H_{17}O$ | $C_{11}H_{23}$ | . 49–51.5 | . 72 | . |
| $C_8H_{17}O$ | $C_{12}H_{25}$ | . 55–56 | . 69.5 | . |
| $C_8H_{17}O$ | $C_{16}H_{33}$ | . 65–67 | . 69–69.5 | . |
| $C_9H_{19}O$ | $C_3H_7$ | . 49–51 | . 91–91.5 | . |
| $C_9H_{19}O$ | $C_4H_9$ | . 58–61 | . 84–85 | . |
| $C_9H_{19}O$ | $C_5H_{11}$ | . 64–66 | . 78 | . |
| $C_9H_{19}O$ | $C_6H_{13}$ | . 64–65 | . 76–76.5 | . |
| $C_9H_{19}O$ | $C_7H_{15}$ | . 53–54 | . 73–73.5 | . |
| $C_9H_{19}O$ | $C_8H_{17}$ | . 54–56 | . 72.5 | . |
| $C_9H_{19}O$ | $C_9H_{19}$ | . 60–61 | . 73 | . |
| $C_9H_{19}O$ | $C_{10}H_{21}$ | . 60–61 | . 70 | . |
| $C_9H_{19}O$ | $C_{11}H_{23}$ | . 52–53.5 | . 67.5 | . |
| $C_9H_{19}O$ | $C_{12}H_{25}$ | . 41–43 | . 66 | . |
| $C_9H_{19}O$ | $C_{16}H_{33}$ | . 64–66 | . 66–66.5 | . |
| $C_{10}H_{21}O$ | $C_3H_7$ | . 60–63 | . 92–92.5 | . |
| $C_3H_7$ | $C_6H_{13}$ | . 63–65 | . (33–33.5) | . |
| $C_4H_9$ | $C_6H_{13}$ | . 59–62 | . (18–19) | . |
| $C_5H_{11}$ | $C_6H_{13}$ | . 31–33.5 | . 40.5–41 | . |
| $C_6H_{13}$ | $C_3H_7$ | . 46–48 | . 51–52 | . |
| $C_6H_{13}$ | $C_4H_9$ | . 54–57 | . (37–38) | . |
| $C_6H_{13}$ | $C_5H_{11}$ | . 48–51 | . (30–31) | . |
| $C_6H_{13}$ | $C_6H_{13}$ | . 27–29 | . 28 | . |
| $C_6H_{13}$ | $C_7H_{15}$ | . 44–45 | . (23.5) | . |
| $C_6H_{13}$ | $C_8H_{17}$ | . 48–49.5 | . (20.5–21) | . |
| $C_6H_{13}$ | $C_9H_{19}$ | . 52–53.5 | . (18) | . |
| $C_6H_{13}$ | $C_{10}H_{21}$ | . 56–56.5 | . (17) | . |
| $C_6H_{13}$ | $C_{11}H_{23}$ | . 62–64 | . (15–15.5) | . |
| $C_6H_{13}$ | $C_{12}H_{25}$ | . 45–47 | . (15) | . |
| $C_6H_{13}$ | $C_{16}H_{33}$ | . 41–43 | . (15) | . |
| $C_7H_{15}$ | $C_3H_7$ | . 45–47 | . 60–62 | . |
| $C_7H_{15}$ | $C_6H_{13}$ | . 18–19 | . 40.5–41.5 | . |
| $C_8H_{17}COO$ | $C_6H_{13}$ | . 70–72 | . 94–95 | . |
| $C_8H_{17}COO$ | $C_7H_{15}$ | . 78–79.5 | . 87–89 | . |
| $C_4H_9OCOO$ | $C_6H_{13}$ | . 79–82 | . 81–84 | . |
| $C_4H_9OCOO$ | $C_7H_{15}$ | . 63–65 | . 73–75 | . |

TABLE 2

2-n-Alkyl-1,4-bis-[4-n-pentyl-cyclohexancarbonyloxy]-benzene

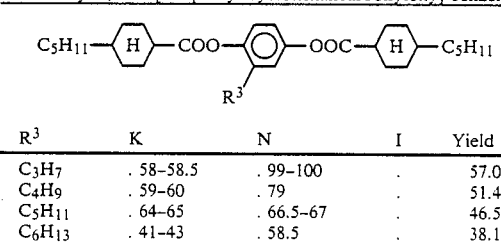

| $R^3$ | K | N | I | Yield % |
|---|---|---|---|---|
| $C_3H_7$ | . 58–58.5 | . 99–100 | . | 57.0 |
| $C_4H_9$ | . 59–60 | . 79 | . | 51.4 |
| $C_5H_{11}$ | . 64–65 | . 66.5–67 | . | 46.5 |
| $C_6H_{13}$ | . 41–43 | . 58.5 | . | 38.1 |

TABLE 2-continued 2-n-Alkyl-1,4-bis-[4-n-pentyl-cyclohexancarbonyloxy]-benzene

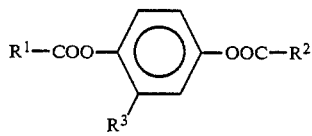

| $R^3$ | K | N | I | Yield % |
|---|---|---|---|---|
| $C_7H_{15}$ | . 46-48 | . 52 | . | 44.6 |

EXAMPLE 2

High viscosities give rise to low relaxation frequencies in nematic liquid crystals.

Viscosities of 2-n-Octyl-1,4-bis-[octoxybenzoyloxy]-benzenes (in the nematic phase $\nu_1$)

t/oC: 25, 56, 64, 76, 80.
$\nu_1$/cSt: 960, 167, 115, 72, 87.

In a comparison thereto, the viscosity of 4-n-alkoxy-benzoic-acid-4-n-alkoxyphenylesters is smaller by the factor of 10.

EXAMPLE 3

Isotropic frequencies $f_o$ of a mixture of 60 mol. % 2-n-octyl-1,4-bis-[4-n-octoxy-benzoyloxy]-benzenes and 40 mol. % 4-n-octoxy benzoic acid-4-($\beta$-cyanoethyl)-phenylester:

t/°C: 20, 25, 33, 48.
$f_o$/kHz: 8, 16, 47, 250.

The clear point of the mixture is 68° C. At room temperature the threshold voltage in the low frequency range is 2.5 V.

EXAMPLE 4

The mixture of Example 2 is utilized in a cell having the following construction: A thin layer (5 to 30 μm layer thickness), which is provided with a transparent, electricity-conducting layer ($SnO_2$ or $In_2O_3$) on its inside, is inserted between two glass disks wherein the distance is kept constant by the insertion of spacers. This device is positioned between crossed polarizers. On a voltage of 5 V/50 kHz, the cell completely extinguishes the light, while, by contrast, at 5 V/12 kHz, a transparent state will arise.

EXAMPLE 5

Production of 2-n-butyl-bis-[4-n-hexoxy-benzoyloxy]-benzenes 4.81 g (0.02 mol) 4-n-hexoxy-benzoyl chloride is added drop by drop at 0° C., under stirring, to a solution of 1.66 g (0.01 mol) 2-n-butyl-hydroquinone dispersed in 50 ml dry pyridine. The mixture is left standing for 24 hours at room temperature, blocking out all humidity from the air, it then being heated for 30 minutes at 110° C. and poured, after it has cooled off, into a mixture consisting of 200 g ice and 100 ml concentrated hydrochloric acid. The precipitate is suctioned off, washed with water and less cold ethanol, and recrystallized several times from ethanol.

Yield: 4.15 g=72.3% of theoretical.
m.p. 67°-68° C., nematic until 96.5° C.

EXAMPLE 6

Production of 2-n-hexyl-1,4-bis-[4-n-heptyl-benzoyloxy]-benzene A solution of 4.77 g (0.02 mol) 4-n-heptyl-benzoyl-chloride in 20 ml toluene is added drop by drop under stirring, at 100° C., to a solution of 1.94 g (0.01 mol) 2-n-hexyl-hydroquinone and 3 g pyridine in 50 ml toluene. The reaction mixture is subsequently heated by boiling for 2 hours and filtered after it has cooled-off.

The filtrate is, in each case, washed with 50 ml water, a 5% solution of sodium hydrocarbonate and water, dried over sodium sulfate and reduced in a vacuum. The remaining oil is absorbed in ethanol and recrystallized at −15° C. Recrystallization is repeated until the melting and clear points have become constant.

Yield: 3.70 g=61.9% of theoretical.
m.p. 18°-19° C., Cl. P. 40.5°-41.5° C.

We claim:

1. A nematic liquid crystal compound of the general formula

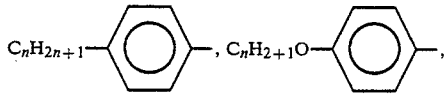

wherein
$R^1 = R^2$ and each is

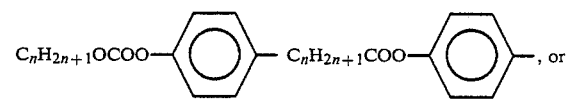

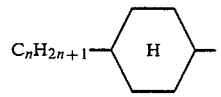

with
n = 1 to 16
$R^3 = n-C_mH_{2m+1}$ with
m = 3 to 14.

2. A nematic liquid crystal compound according to claim 1 characterized by the formula

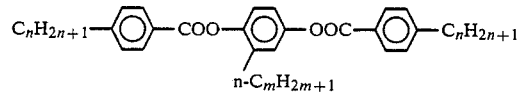

with
n = 1 to 16 and
m = 3 to 14.

3. A nematic liquid crystal compound according to claim 1 characterized by the formula

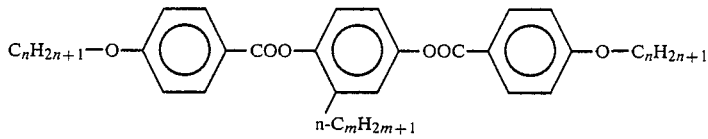

with
n = 1 to 16 and
m = 3 to 14.

4. A nematic liquid crystal compound according to claim 1 characterized by the formula

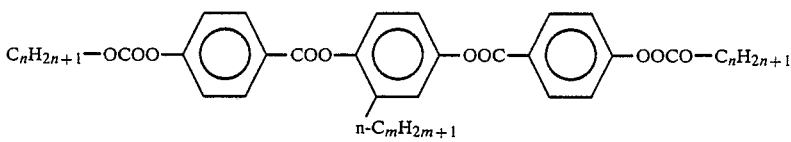

with
n = 1 to 16 and
m = 3 to 14.

5. A nematic liquid crystal compound according to claim 1 characterized by the formula

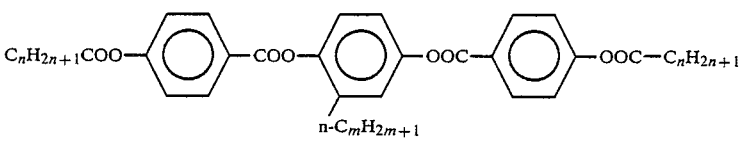

with
n = 1 to 16 and
m = 3 to 14.

6. A nematic liquid crystal compound according to claim 1 characterized by the formula

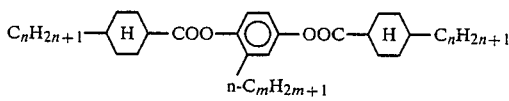

with
n = 1 to 16 and
m = 3 to 14.

7. The compound of claim 3 2-n-octyl-1,4-bis-(4-n-octoxybenzoyloxy)-benzene.

8. The compound of claim 3 2-n-butyl-1,4-bis(4-n-hexoxy-benzoyloxy)-benzene.

9. The composition of claim 2 2-n-hexyl-1,4-bis-(4-n-heptylbenzoyloxy)-benzene.

10. An electro-optical device including means for generating an electric field, said device containing the nematic liquid crystal compound of claim 1.

11. An electro-optical device including means for generating an electric field, said device containing the nematic liquid crystal compound of claim 2.

12. An electro-optical device including means for generating an electric field, said device containing the nematic liquid crystal compound of claim 3.

13. An electro-optical device including means for generating an electric field, said device containing the nematic liquid crystal compound of claim 4.

14. An electro-optical device including means for generating an electric field, said device containing the nematic liquid crystal compound of claim 5.

15. An electro-optical device including means for generating an electric field, said device containing the nematic liquid crystal compound of claim 6.

16. The compound of claim 3, 2-n-hexyl-1,4-bis-(4-n-heptoxybenzoyloxy)-benzene.

17. The compound of claim 3, 2-n-undecyl-1,4-bis-(4-n-octoxybenzoyloxy)-benzene.

18. The compound of claim 3, 2-n-dodecyl-1,4-bis-(4-n-nonoxybenzoyloxy)-benzene.

19. The compound of claim 6, 2-n-propyl-1,4-bis-(4-n-pentylcyclohexancarbonyloxy)-benzene.

20. A nematic liquid crystal mixture containing a compound according to any one of claims 1 to 6, 7 to 9, or 16 to 19.

* * * * *